United States Patent
Gao et al.

(10) Patent No.: US 8,971,801 B2
(45) Date of Patent: Mar. 3, 2015

(54) SELF-ENERGIZED WIRELESS SENSOR AND METHOD USING MAGNETIC FIELD COMMUNICATIONS

(75) Inventors: Robert X. Gao, Manchester, CT (US); Sripati Sah, Wakefield, MA (US)

(73) Assignee: University of Connecticut, Farmington, CT (US)

( * ) Notice: Subject to any disclaimer, the term of this patent is extended or adjusted under 35 U.S.C. 154(b) by 233 days.

(21) Appl. No.: 13/548,813

(22) Filed: Jul. 13, 2012

(65) Prior Publication Data

US 2013/0017783 A1    Jan. 17, 2013

Related U.S. Application Data

(60) Provisional application No. 61/508,390, filed on Jul. 15, 2011.

(51) Int. Cl.
    *H04B 5/00* (2006.01)
(52) U.S. Cl.
    CPC ............ *H04B 5/0031* (2013.01); *H04B 5/0075* (2013.01)
    USPC ............ 455/41.1; 455/41.3; 455/20; 310/328
(58) Field of Classification Search
    USPC .................. 455/41.1, 41.3, 20, 22, 13.3, 522; 310/328, 321
    See application file for complete search history.

(56) References Cited

U.S. PATENT DOCUMENTS

| | | | | |
|---|---|---|---|---|
| 3,609,402 A | * | 9/1971 | Ferro et al. | 327/190 |
| 3,728,947 A | * | 4/1973 | Harnden et al. | 396/182 |
| 3,731,182 A | * | 5/1973 | Hirono et al. | 323/325 |
| 3,761,792 A | * | 9/1973 | Whitney et al. | 318/788 |
| 4,059,831 A | * | 11/1977 | Epstein | 342/44 |
| 4,198,547 A | * | 4/1980 | Ferraro | 379/234 |
| 4,308,491 A | * | 12/1981 | Joyner et al. | 318/732 |
| 4,380,719 A | * | 4/1983 | De Bijl et al. | 315/101 |
| 5,469,170 A | * | 11/1995 | Mariani | 342/51 |
| 5,637,973 A | | 6/1997 | Hirai et al. | |
| 6,449,563 B1 | * | 9/2002 | Dukhin et al. | 702/22 |

(Continued)

OTHER PUBLICATIONS

International Preliminary Report on Patentability for PCT/US2012/046724 entitled "Self-Energized Wireless Sensor and Method Using Magnetic Field Communications" dated Jan. 30, 2014.

(Continued)

*Primary Examiner* — Minh D Dao
(74) *Attorney, Agent, or Firm* — Hamilton, Brook, Smith & Reynolds, P.C.

(57) ABSTRACT

Manufacturing processes monitor forces or pressures within a machine. Metal within machines affect wireless communications within the machines for reporting monitored data. An embodiment of the present invention is a sensor that provides wireless communications unaffected by metals and with less electrical noise than slip rings. An embodiment can monitor manufacturing processes, such as by employing a piezoelectric transducer to measure forces or pressures in a machine and generate an electrical signal representing, for example, forces measured by the piezoelectric transducer. A threshold modulator circuit converts the electrical signal into a series of electrical pulses, which can be transmitted as a corresponding series of magnetic field pulses to a wireless receiver. The receiver reconstructs the original electrical signal, thereby enabling a receiver system to determine physical activities in the machine. The embodiment may be self-powered through use of power generated by the piezoelectric transducer.

40 Claims, 11 Drawing Sheets

(56) References Cited

U.S. PATENT DOCUMENTS

| | | | |
|---|---|---|---|
| 6,597,179 B2* | 7/2003 | St-Germain | 324/500 |
| 6,864,802 B2 | 3/2005 | Smith et al. | |
| 8,240,911 B1* | 8/2012 | Pfeifer et al. | 374/117 |
| 2007/0284451 A1 | 12/2007 | Uramoto | |
| 2007/0284969 A1* | 12/2007 | Xu | 310/339 |
| 2008/0171512 A1 | 7/2008 | Jack et al. | |
| 2010/0164711 A1 | 7/2010 | Arms et al. | |
| 2012/0316630 A1* | 12/2012 | Firlik et al. | 607/116 |
| 2014/0062666 A1* | 3/2014 | Patterson | 340/10.1 |

OTHER PUBLICATIONS www.intelligent-systems.info/energy_harvesting; "Self Powered Sensor" Energy Harvesting: Self-powered sensor. Retrieved from internet Jan. 21, 2014.

www.microstrain.com/energy harvesting/eh-link; "Energy Harvesting Sensors", EH-Link Energy Harvesting Wireless Node. Retrieved from internet Jan. 21, 2014.

Sardini, E. and Serpelloni, M.; "Passive and Self-Powered Autonomous Sensors for Remote Measurements", Sensors 2009, 9, 943-960. Feb. 13, 2009.

Soh, S. "Investigation of Contact Pressure Distribution on Sheet Metal Stamping Tooling Interfaces: Surface Modeling, Simulations, and Experiments", University of Massachusetts Amherst, Sep. 2007.

Bansai, R., "Near-Field Magnetic Communication", IEEE Antennas and Propogation Magazine, vol. 46, No. 2, Apr. 2004.

Theurer, C., "Energy Extraction for a Self-Energized Pressure Sensor", IEEE Sensors Journal, vol. 4, No. 1, Feb. 2004.

Theurer, C., Passive Charge Modulation for a Wireless Pressure Sensors:, IEEE Sensors Journal, vol. 6, No. 1, Feb. 2006.

US Department of Transportation, Federal Railroad Administration, Reseach Results; RR 08-30, Nov. 2008.

Takura, T., "Basic Evaluation of Signal Transmission Coil in Transcutaneous Magnetic Telemetry System for Artificial Hearts", IEEE Transactions on Magnetics, vol. 41., No. 10, Oct. 2005.

Mahayotsanun, N., "Tooling-Integrated Sensing Systems for Stamping Process Monitoring" International Journal of Machine Tool s& Manufacturing, 49:634-644, 2009.

Notification of Transmittal of the International Search Report and theWritten Opinion of the International Searching Authority of the Declaration for International Application No. PCT/US2012/046724, Date of Mailing Dec. 26, 2012.

\* cited by examiner

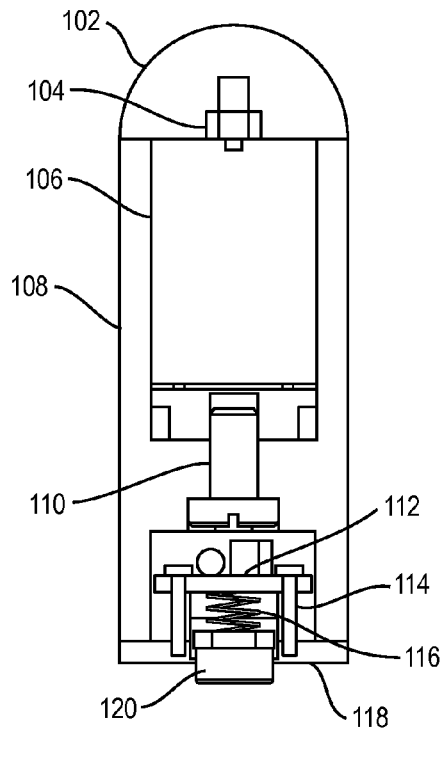
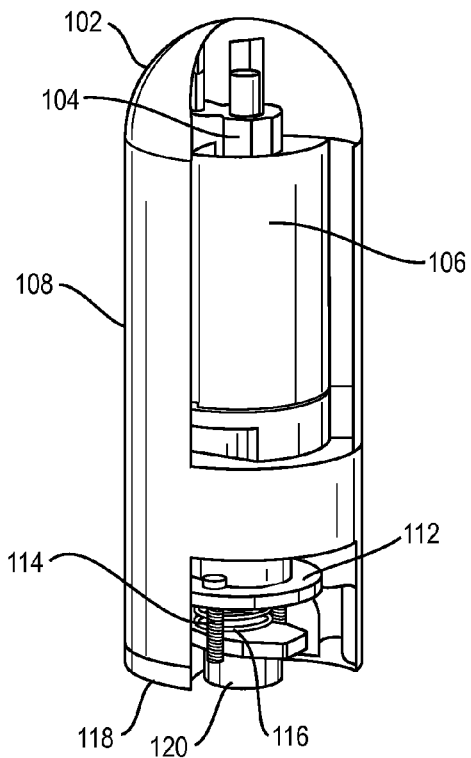
FIG. 1A   FIG. 1B
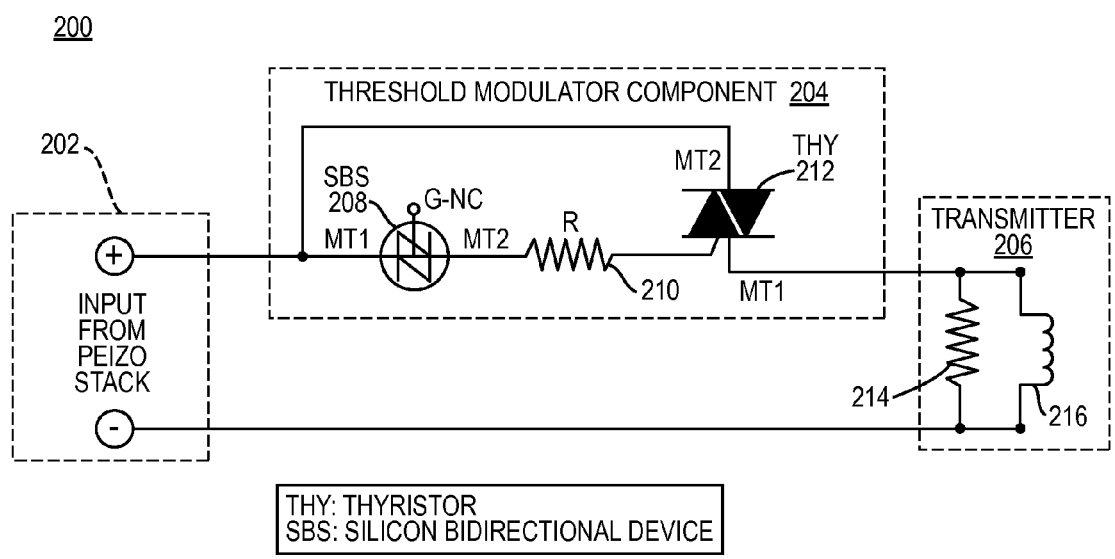
FIG. 2

SELF-ENERGIZED WIRELESS SENSOR AND METHOD USING MAGNETIC FIELD COMMUNICATIONS

RELATED APPLICATION

This application claims the benefit of U.S. Provisional Application No. 61/508,390, filed on Jul. 15, 2011. The entire teachings of the above application are incorporated herein by reference.

GOVERNMENT SUPPORT

This invention was made with government support under grant # CMMI-0936075 awarded by the National Science Foundation. The government has certain rights in the invention.

BACKGROUND OF THE INVENTION

For improved performance of manufacturing operations, such as forming, cutting, and grinding processes, it is useful to understand and compensate for dynamic interactions between the processes and machines. Validity and utility of structural analysis based on Finite Element models are dependent on boundary conditions assumed when running simulations. Maintaining process parameters becomes difficult without closed-loop control, especially under high loads and working stresses.

Manufacturing processes often employ monitoring of forces and pressures to ensure that resulting articles of manufacture meet certain specifications of quality. Many of these manufacturing processes do not have adequate physical space where sensors can be placed without interfering with the manufacturing processes. Alteration of the process to accommodate sensor wiring can be expensive and time consuming. Likewise, wires for either power or communications, running to and from the sensors, can disrupt the manufacturing processes by occupying limited free space. In addition, wires have a potential to get tangled with moving or non-moving parts, further disrupting the manufacturing processes.

Sensors also generally cannot communicate, in a robust manner, wirelessly through radio frequency (RF) within manufacturing processes because most manufacturing machines employ steel or other RF-blocking metals, rendering RF communications unreliable or ineffective.

Some manufacturing processes use mechanical slip rings to communicate information wirelessly across rotating or translating mechanical interfaces and transfer power. Slip rings, in their current form, use metal contacts that rotate or translate relative to each other that tend to add electrical noise to signals. In addition, slip rings wear over time, adding more electrical noise or loss-of-signal errors, thereby requiring replacement and stoppage of the corresponding manufacturing process. Likewise slip rings, by a natural wearing process, produce a fine particulate dust which can be disruptive in clean working environments.

SUMMARY OF THE INVENTION

An embodiment of the present invention includes a method of transmitting information via a wireless medium. This method comprises converting an electrical signal representing information into a series of electrical pulses and generating a series of magnetic field pulses corresponding to the series of electrical pulses to transmit a representation of the information via a wireless medium. This embodiment can further comprise receiving the series of magnetic field pulses via the wireless medium and reconstructing the information based on the series of magnetic field pulses received.

Another embodiment of the present invention includes a circuit comprising an input port and an output port, a resistor having a first lead and a second lead, a silicon bidirectional switch electrically coupled in series with the input port and first lead of the resistor, and a thyristor having its voltage control input coupled in series with the second lead of the resistor and its current flow path coupled in series with the input port and output port.

Another embodiment of the present invention includes a communications system comprising a transducer configured to produce an electrical signal representative of an applied force or pressure, a threshold modulator circuit coupled to the transducer and configured to convert the electrical signal to a series of electrical pulses, and a transmitter coupled to the threshold modulator circuit and configured to convert the series of electrical pulses to a series of magnetic field pulses and transmit the series of magnetic field pulses to a wireless medium.

Another embodiment of the present invention includes a communications system comprising means for converting an electrical signal into a series of electrical pulses, means for generating a corresponding series of magnetic pulses, and means for transmitting the series of magnetic field pulses to a wireless medium.

Another embodiment of the present invention includes a non-contact slip ring, comprising an interior member and an exterior member. The interior member communicates with the exterior member (or vice versa) without coming into physical contact with each other. The interior member comprises a transducer configured to produce an electrical signal representation of measured data, a threshold modulator circuit coupled to the transducer configured to convert the electrical signal to a series of electrical pulses, and a transmitter coupled to the threshold modulator circuit configured to convert the series of electrical pulses to a corresponding series of magnetic field pulses and transmit the series of magnetic field pulses to a wireless medium. The exterior member comprises a receiver configured to receive the series of magnetic field pulses from the transmitter via the wireless medium and a signal reconstruction circuit configured to determine the force or pressure as a function of the series of magnetic field pulses received. The interior member does not transfer power to the exterior member and the exterior member does not transfer power to the interior member.

Some embodiments of the present invention employ a threshold modulator circuit to convert the electrical signal. In some embodiments, the threshold modulator circuit includes a silicon bidirectional switch, thyristor, and resistor. In one embodiment, the threshold modulator circuit receives an electrical signal at the input port and converts the electrical signal to a series of electrical pulses. In another embodiment, the resistor can be selectively programmed. In yet another embodiment, the threshold modulator circuit can be programmed to control the strength, and therefore the range, of the magnetic field transmission. The threshold modulator circuit can also be programmed to control the resolution of the transmitted signal.

Some embodiments of the present invention include a transmitter component coupled to the output port configured to generate a series of magnetic field pulses corresponding to the series of electrical pulses. Some embodiments include a receiver component configured to receive the series of magnetic field pulses via a wireless medium from the transmitter component. Some embodiments include a signal reconstruction circuit configured to determine the force or pressure from the series of magnetic field pulses. Some embodiments include a hardware- or software-based signal reconstruction module configured to approximate the original electrical signal from the series of magnetic pulses it receives.

In some embodiments, the electrical signal represents a physical force or pressure. In some embodiments, the electrical signal is an analog waveform. In some embodiments, the electrical signal is a digital waveform that represents information. In some embodiments, the series of magnetic field pulses is a digital waveform.

Some embodiments of the present invention resolves the electrical pulses using n-levels, wherein n is based on a largest expected amplitude divided by a minimum amplitude detection level of the electrical signal. In one embodiment, the threshold modulator circuit allows for automated control to modify the range and resolution of the magnetic pulses by receiving wireless or wired instructions.

Some embodiments of the present invention employ a piezoelectric (or other ceramic formulation) transducer or a force-to-electrical transducer to produce the electrical signal. In some embodiments, the force-to-electrical transducer is coupled to the input port and provides an electrical signal to the threshold modulator circuit as a function of force or pressure. In some embodiments, the force-to-electrical transducer, threshold modulator circuit, and transmitter form a current loop around which current flow is bidirectional. In some embodiments, the force-to-electrical transducer is a piezoelectric transducer or a piezoelectric stack. In some embodiments, the piezoelectric transducer may include several layers that are arranged in an electrically parallel and mechanically serial configuration.

Some embodiments of the present invention operate in a self-powered manner. For example, embodiments may be powered by energy generated by the transducer from the application of a time varying force or pressure.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A and 1B are mechanical schematic diagrams illustrating a design and component listing of an embodiment of the invention.

FIG. 2 is an electrical schematic diagram of the threshold modulator circuit according to one embodiment of the invention.

DETAILED DESCRIPTION OF THE INVENTION

Figure 3A:
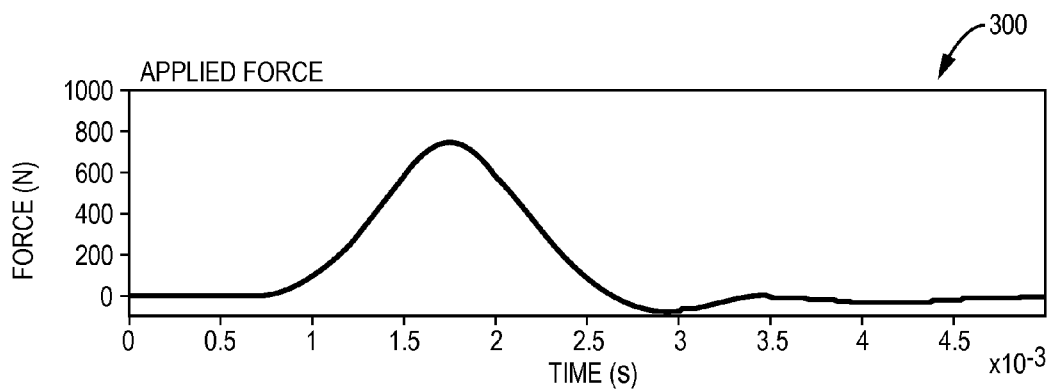
FIGS. 3A-3D are example graphs illustrating experimental results of a force reconstruction.

A description of example embodiments of the present invention follows.

An embodiment of the present invention is a self-energized wireless force sensing apparatus and corresponding method that employs magnetic field communications. In embodiments in which no batteries or cable connections are present or available for sensor operations, in one application, the force sensing apparatus can be directly embedded within a machine tooling structure for remote measurement in real-time, where the force sensing apparatus includes a transducer and constituent components for converting transducer output signals into conditioned electrical signals.

A comprehensive model describing the sensor transfer function under electro-mechanical loading and the behavior of the embedded electronics for wireless data transmission may be derived for particular specifications of transducers and electrical components, or, in an embodiment providing electronics only, a model of just the electronics may be derived. Simulations performed indicate that an embodiment of the wireless sensor can accurately measure dynamic forcing events that last longer than 2 msec.

An embodiment of the sensor can measure forces up to 5 kN, with a resolution of 40 N. An embodiment of the sensor can be packaged as a cylindrical unit of 5 cm in height, with a possible maximum diameter being 2 cm in some configurations and more or less in others. Other ranges of time, force, and physical length are also to be understood within the scope of the present invention.

FIG. 1A shows a mechanical schematic diagram of a sensor 100 that illustrates a design of an embodiment of the invention. Optional compact size and ability to measure large forces allow embodiments of the sensor 100 to be integrated into a wide variety of machine structures for direct measurement of process-machine interactions and improved process controls. The sensor 100 includes an impact cap 102, threaded moving end 104, piezostack 106, main casing 108, countersunk piezostack bolt 110, threshold modulator circuit 112, circuit holding screws 114, transmitter holding spring 116, bottom cap 118, and transmitter 120.

FIG. 1B is a diagram 150 illustrating a three-dimensional cutaway view of an embodiment of the invention. The sensor of FIG. 1B includes the features of the sensor 100 in FIG. 1A.

FIG. 2 is a block diagram 200 illustrating a threshold modulator component 204 of an embodiment of the sensor. The main components in the threshold modulator component 204 are a silicon bidirectional switch (SBS) 208 and the thyristor (THY) 212. Examples of commercial available model of silicon bidirectional switches can be found using the following model numbers NTE 6403, MBS 4991-4993, or BS080; and an example of a commercial available thyristor includes an LX8003. These model numbers may be employed in several embodiments of the invention, and other silicon bidirectional switches and thyristors can alternatively be integrated into the threshold modulator component 204.

The SBS 208 has a high internal impedance until the voltage across it reaches a certain threshold voltage, at which instant the SBS 208 switches into a low impedance state. This indicates that, theoretically, the SBS 208 acts alone as the threshold modulator; however, the applications of this embodiment can be limited.

The switch-off function of the SBS 208 is current controlled. The SBS 208 switches into an "off" mode when the voltage drops under the threshold voltage. This happens when the throughput current is lower than a certain holding current $I_h$. Tests have identified that the current generated by an electronic transducer, which in one embodiment can be a piezoelectric transducer or a piezostack (e.g., input from piezostack 202), often exceeds $I_h$. This indicates the SBS 208 gets "stuck" in an "on" mode and does not generate pulses. For this reason, the thyristor 212 is employed within the threshold modulator component 204 where the thyristor 202 has a higher current handling capacity than the SBS 208. The SBS 208 then only switches the thyristor 212 ON and OFF, and the load current is handled by the thyristor 212. The resistor R 210 limits the current through the SBS 208.

The main components in the circuit are the SBS 208 and a thyristor 212. The SBS 208 has a high internal impedance. When the voltage across it reaches a predetermined threshold voltage value, it instantly switches into a low impedance state.

FIG. 3A is a plot illustrating an example embodiment of the sensor operation. A first plot 300 shows the force applied to an embodiment of the invention by a hammer hit. In this example, the piezostack experiences a force of 800 N during a 1.5 millisecond time period.

Figure 3B:
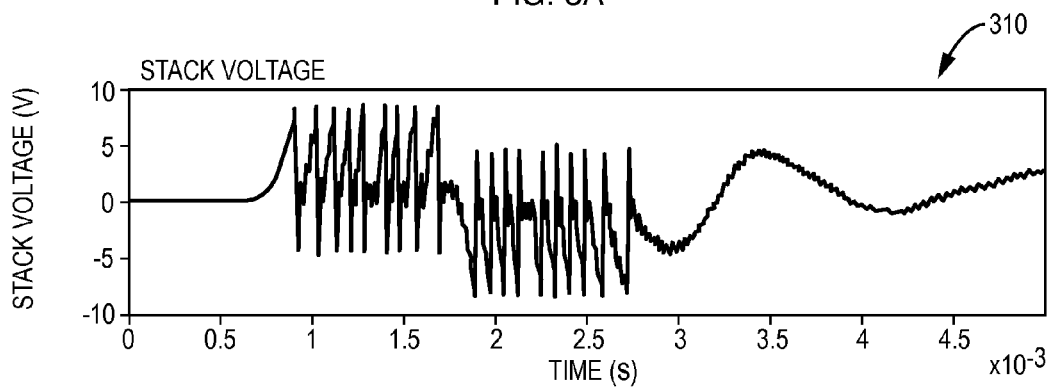

FIG. 3B is a plot illustrating an example embodiment of the sensor operation. A second plot 310 shows the voltage generated by an electronic transducer, such as a piezostack. In this embodiment, while the applied force is increasing, the piezostack generates charge in a positive direction, thus increasing its internal voltage. In this embodiment, during a period of decreasing force, the electronic transducer or piezostack generates charge in the negative direction.

Figure 3C:
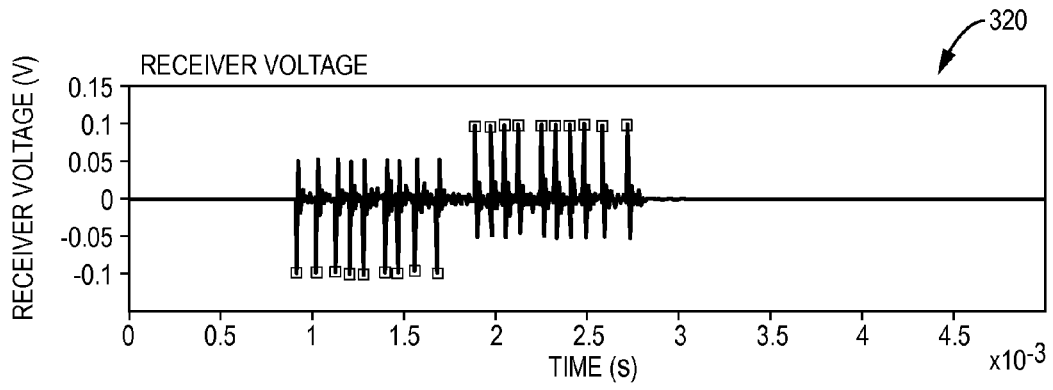

FIG. 3C is a plot illustrating an example embodiment of the sensor operation.

Once the internal voltage reaches a threshold voltage (e.g., 8.5V), the threshold modulator 204 transitions into the open condition (i.e., high impedance state) and (almost) instantaneously discharges the charge collected in the electronic transducer or piezostack into the transmitting inductor. Every time this discharge takes place, a magnetic field pulse is generated. This magnetic field pulse is picked up by the receiver as shown in third plot 320. The magnetic field pulse is directional and its direction, determined by whether the pulse is positive or negative, depends on the direction of the original charge on the electronic transducer or piezostack. In one embodiment, increasing force leads to negative pulses, and decreasing force leads to positive pulses. In an alternative embodiment, increasing force leads to positive pulses, and decreasing force leads to negative pulses. In another embodiment the pulses generated corresponding to increasing and decreasing force may be distinguished based on respective component frequencies of the pulses.

Figure 3D:
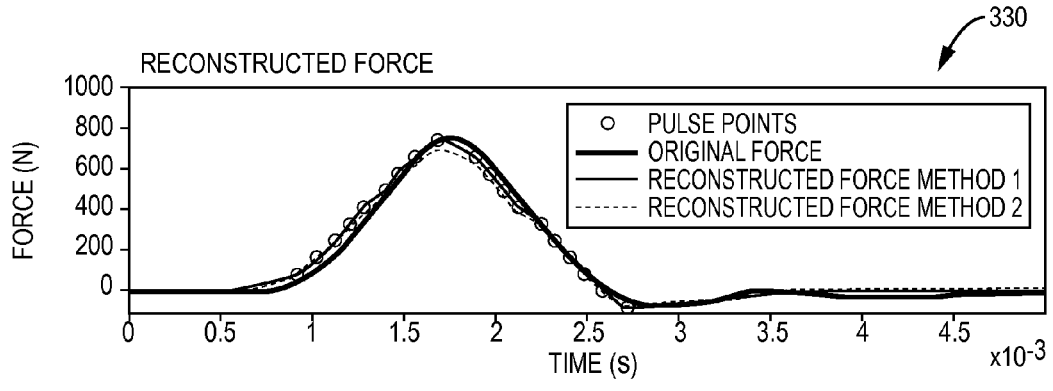

FIG. 3D is a plot illustrating an example embodiment of the sensor operation. In one embodiment, the received pulses can be used to reconstruct the original, applied force. A fourth plot 330 shows the reconstructed force using two different reconstruction methods.

Figure 4:
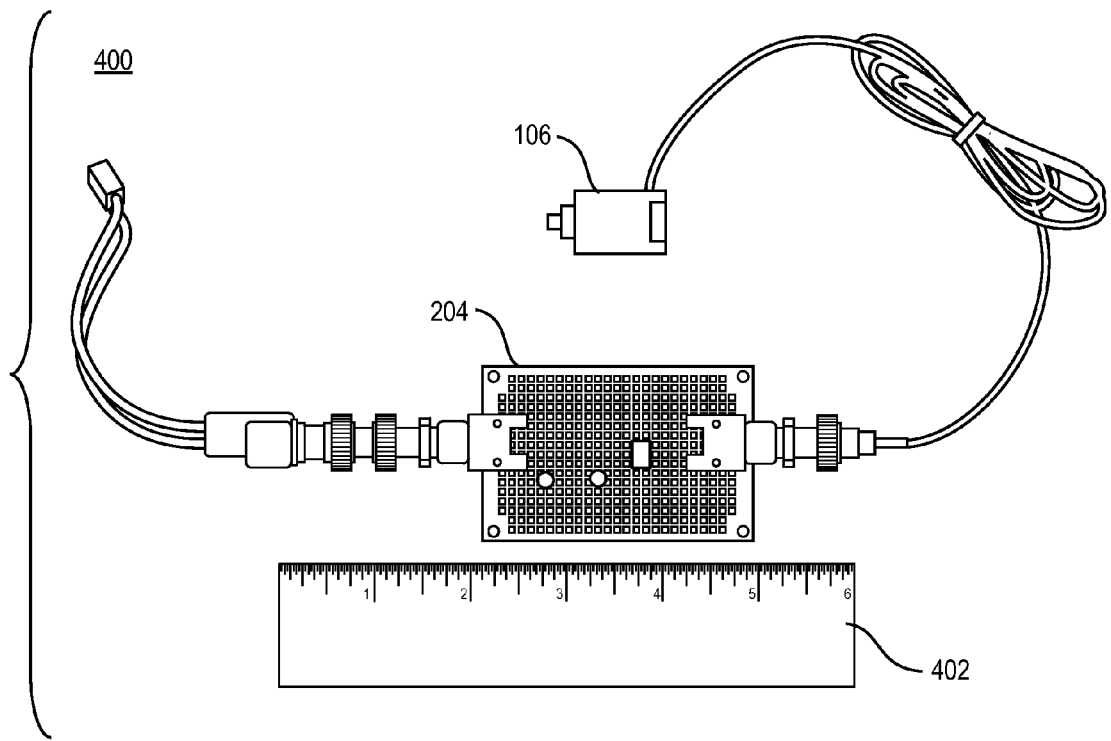
FIG. 4 is a diagram illustrating one embodiment of a functional unit without packaging.

FIG. 4 is a diagram 400 illustrating an example embodiment for testing or debugging a sensor. The piezostack 106 is coupled with an embodiment of the threshold modulator component 204. This embodiment of the threshold modulator component 204 is implemented within a breadboard, however, could alternatively be implemented on a printed circuit board, integrated circuit, or other embodiment of a circuit. An example scale 402 illustrates that the testing embodiment of the threshold modulator component 204 is on the scale of ten centimeters, and the piezostack 106 is on the scale of five centimeters. However, other sizes of the piezostack 106 and threshold modulator component 204 can be implemented.

Figure 5:
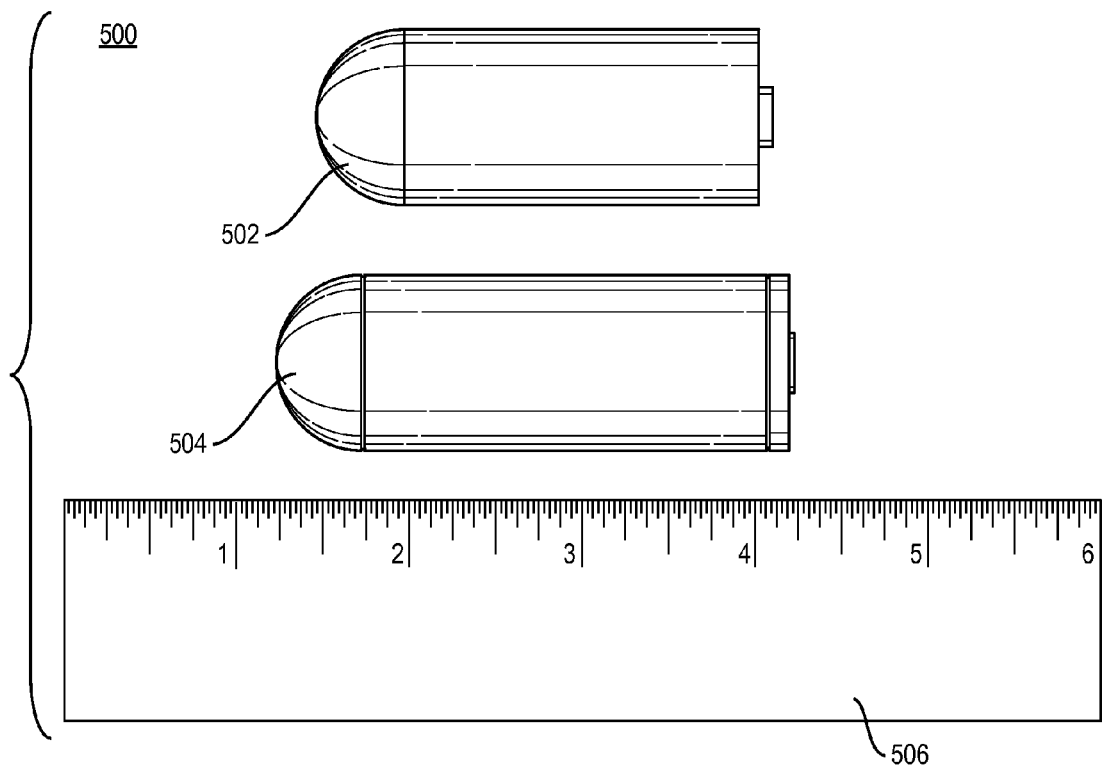
FIG. 5 is a diagram illustrating two embodiments within their respective packaging.

FIG. 5 is a diagram 500 illustrating two example embodiments in which the components of a sensor are integrated into a single package. The package can be designed using computer aided design (CAD) methods, among other methods. The package can be prototyped using a 3D printer, among other methods. Two example materials of the packaging are ABS plastic (sensor 1 502) and aluminum (sensor 2 504). Initial testing of the prototype led to a third prototype machined in aluminum (not shown). Example scale 506 illustrates that sensor 1 502 and sensor 2 504 can be on the scale of under 10 centimeters. However, other embodiments of a sensor can be more or less than 10 centimeters.

Figure 6A:
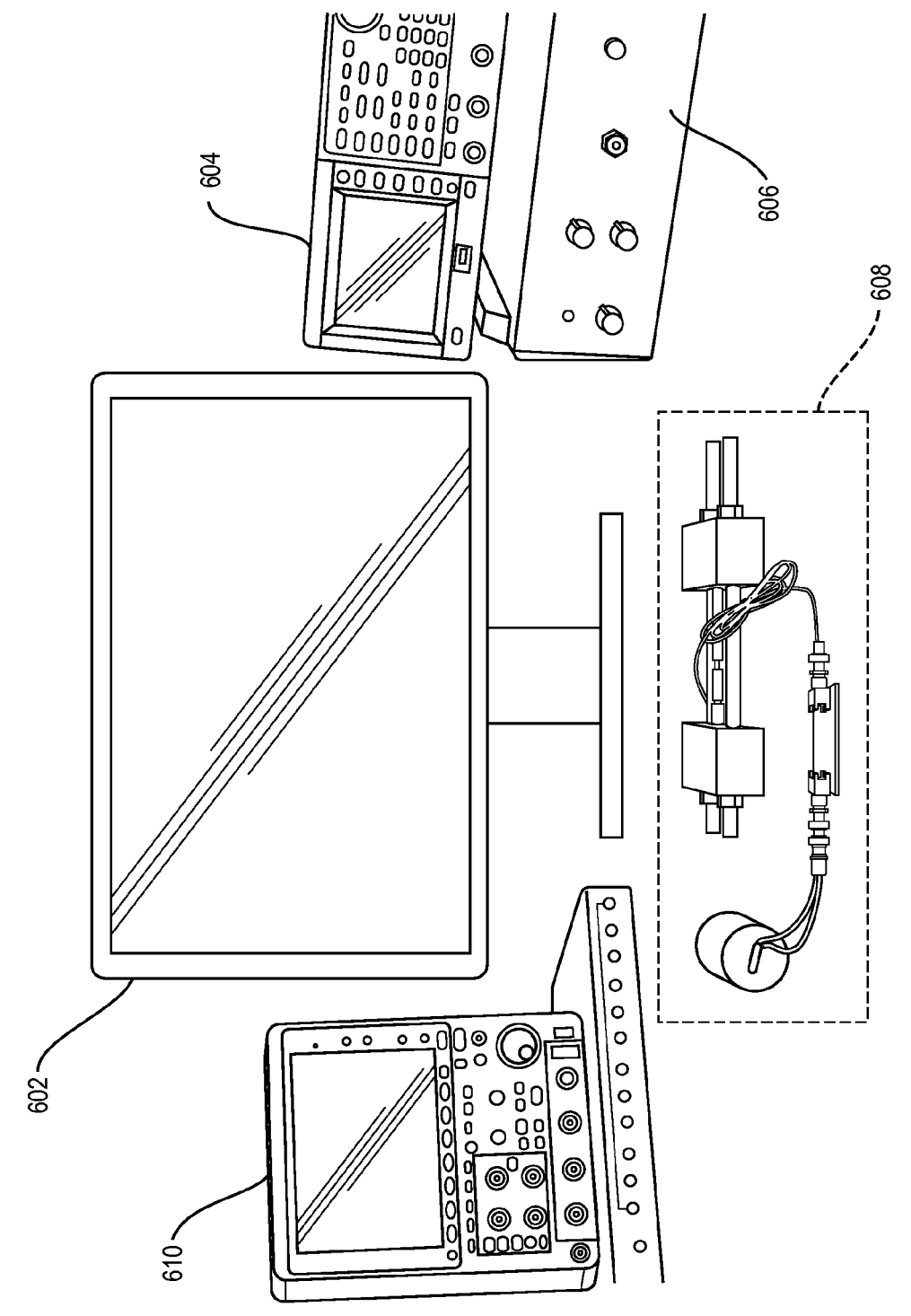
FIGS. 6A and 6B are diagrams illustrating an example measurement station for characterizing sensor performance.

FIG. 6A is a block diagram 600 of a testing setup 608. The testing setup 608 includes a function generator 604 that creates a test drive signal stimulus, which is then amplified through a power amplifier 606 to drive an actuating piezostack 632.

Figure 6B:
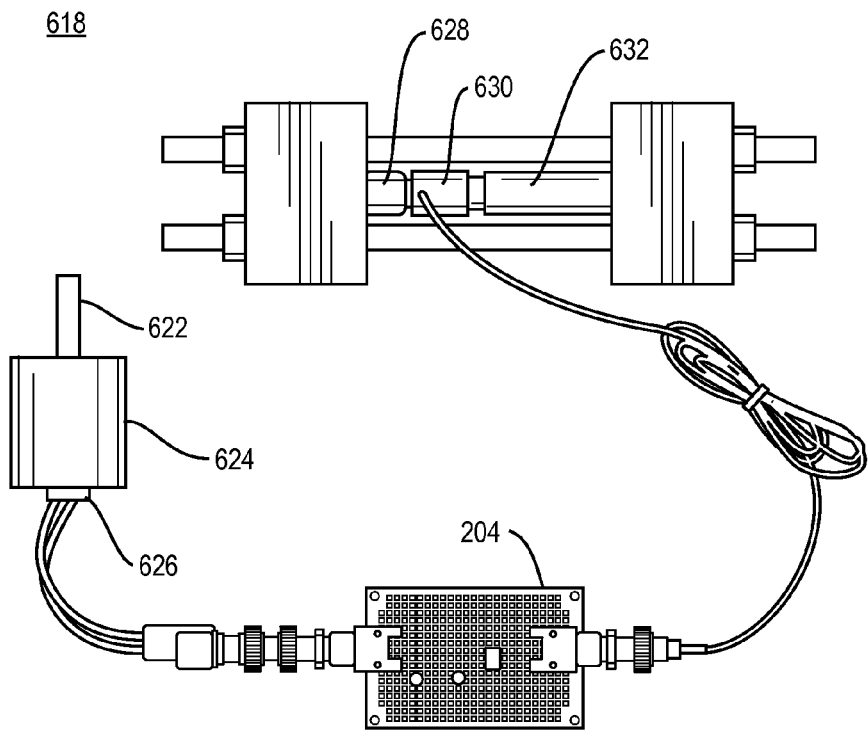

FIG. 6B is an overhead view of the test setup 618 of FIG. 6A. In the test setup 618, a piezostack actuator (e.g., an actuating piezostack 632) applies a force to a sensing piezostack 630 that generates power. The applied force can also be measured by an independent reference sensor 628. The pulses generated by the threshold modulator component 204 are transmitted by a solenoid transmitter 626 in a steel block 624 and received by a solenoid receiver 622 (e.g., a solenoid coil). The pulses received by the solenoid receiver 622 are captured by a high speed digitizer, such as Oscilloscope 610. A program may be employed in the test setup 618 to reconstruct the force applied to the sensing piezostack 630 and the reference sensor 628 from the representations of the applied force and reference force on a computer monitor or in another form and display pulses.

Figure 6C:
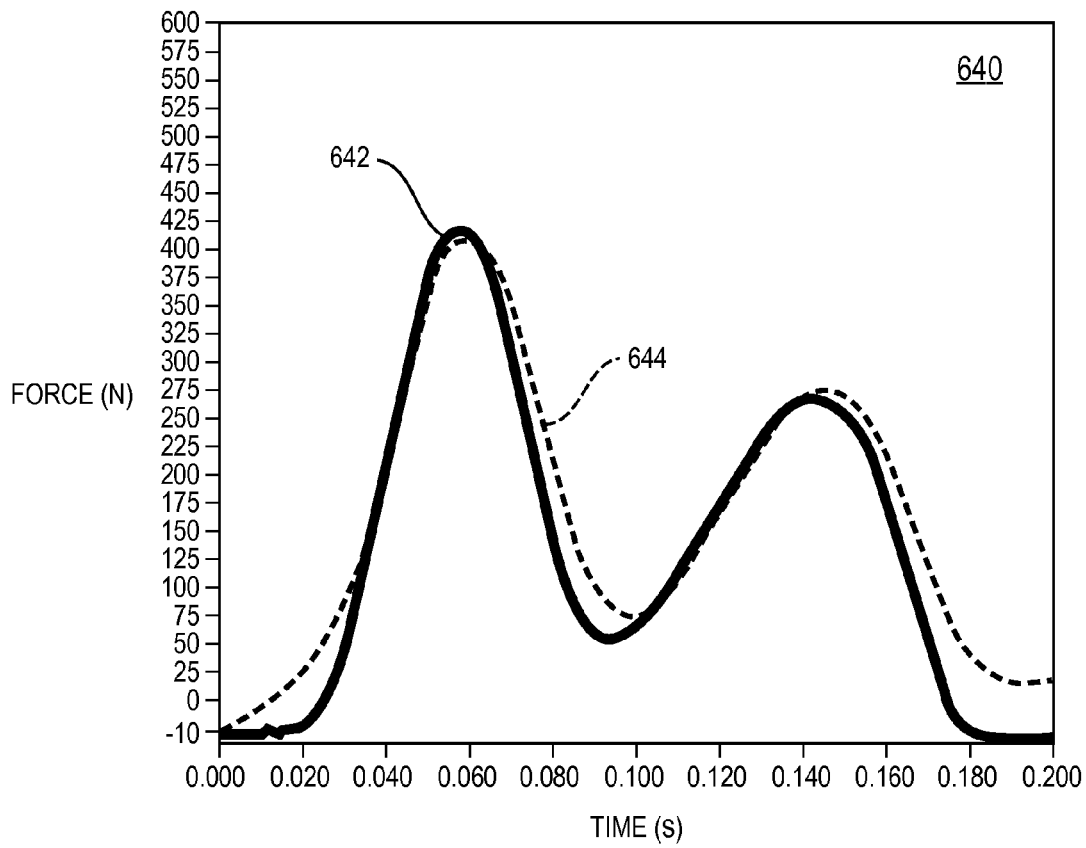
FIG. 6C is a chart diagram that displays a reconstructed force and a reference force at an example measurement station.

FIG. 6C is a chart diagram 640 that displays reconstructed force 644 and a reference force 642 from the test setup 618 of FIGS. 6A and 6B. Notably, although transmission of a representation of the applied force from the solenoid transmitter 626 to the solenoid receiver 622 is performed using pulses, the solenoid receiver 622 is performed using pulses, the reconstructed force 644 plot is smooth and substantially matches the reference force 642, which did not get converted into pulses.

Figure 7:
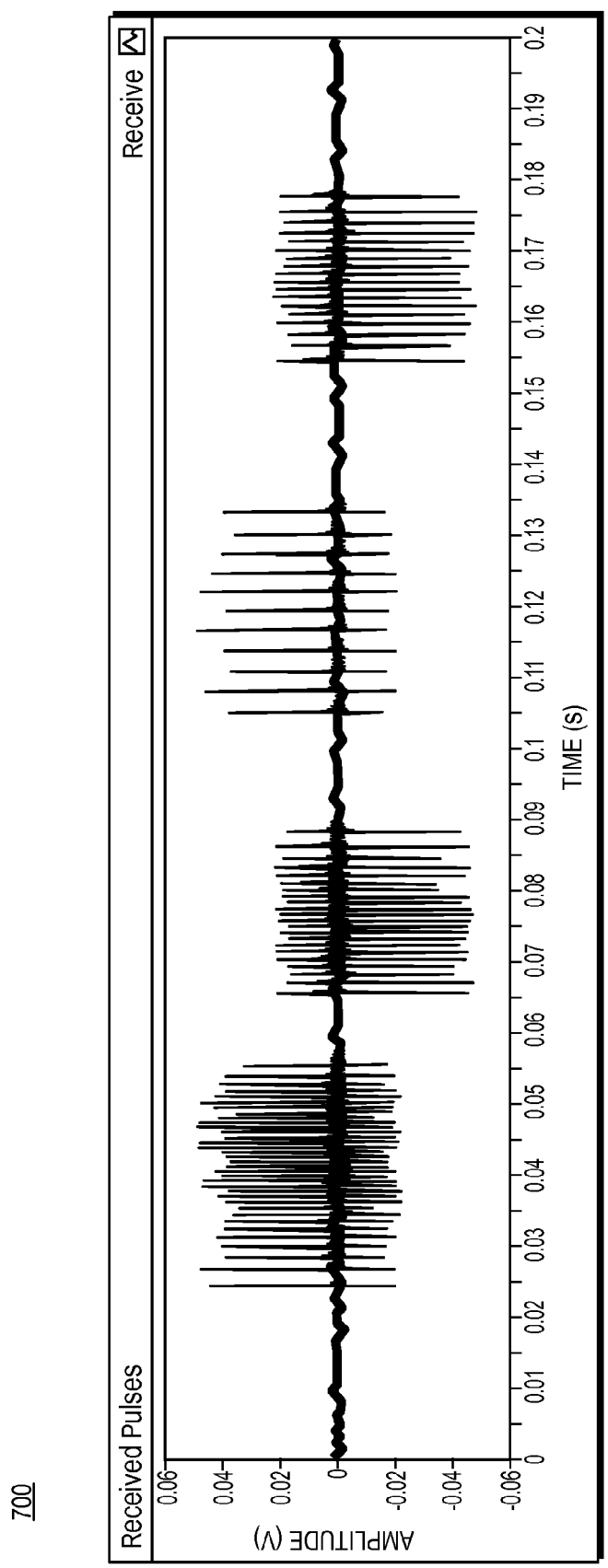
FIG. 7 is a plot illustrating example received pulses by a receiver according to an embodiment of the invention.

FIG. 7 is a chart diagram 700 illustrating an example embodiment of captured digital pulses such as the ones of the test setup 618 in FIGS. 6A-C. For example, a positive digital pulse can represent an increasing force, and a negative digital pulse can represent a decreasing force. In another example, positive digital pulse can represent an decreasing force, and a negative digital pulse can represent an increasing force. The digital pulses generated corresponding to increasing and decreasing force may be distinguished based on respective component frequencies of the digital pulses.

An embodiment of the invention provides online force reconstruction. The reference force 642 and reconstructed force can be shown on the display 602 or the oscilloscope 610 of FIG. 6A. In an embodiment, the pulses in chart diagram 700 represent the actual force increasing or decreasing by a set amount. In another embodiment, each pulse is associated with a finite and equal development of charge in the piezostack. In another embodiment, the input force can be reconstructed using a charge-to-force transfer function. In yet another embodiment, the input force can be reconstructed using polynomial approximations.

Figure 8:
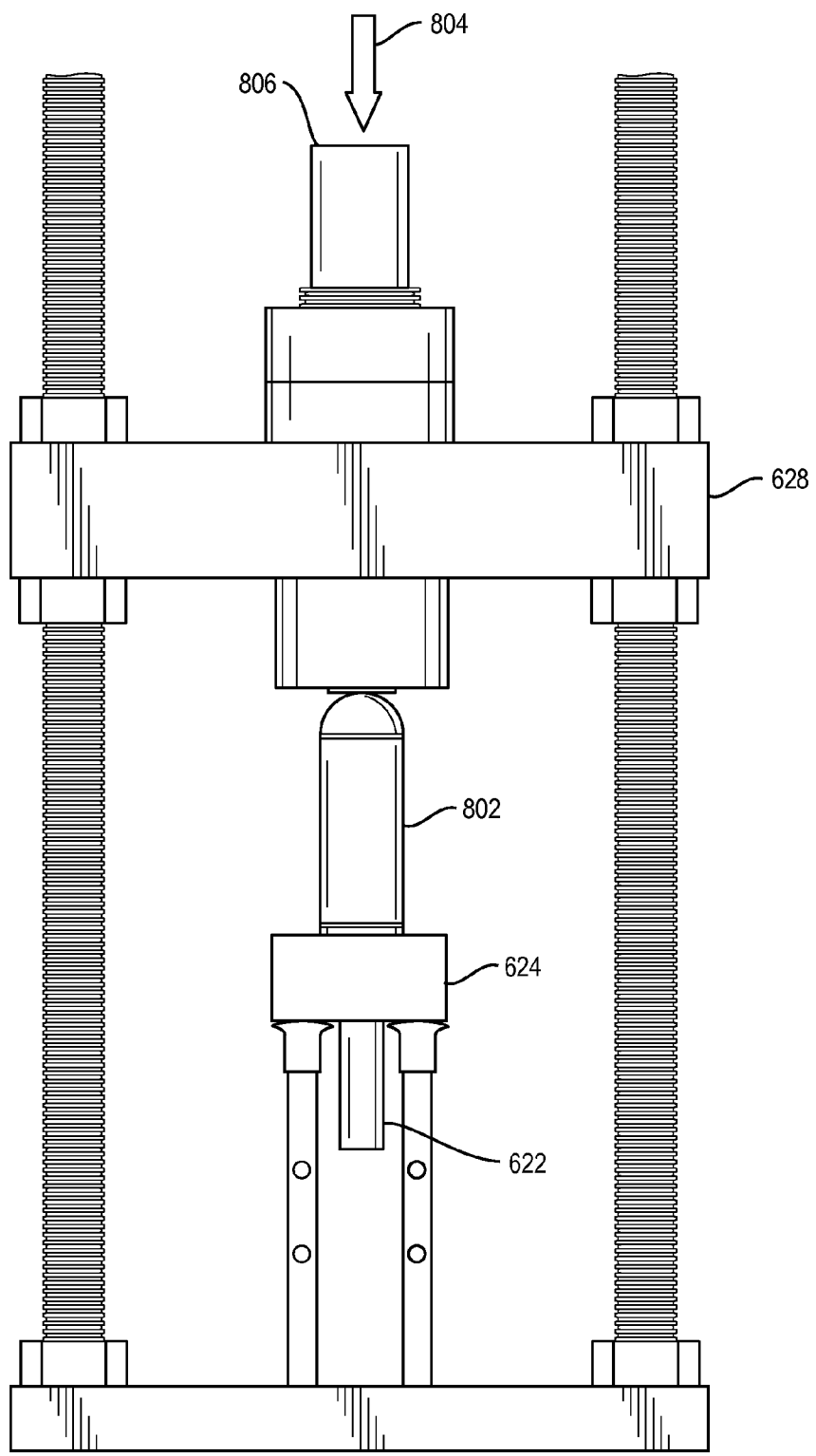
FIG. 8 is a diagram illustrating an automated test rig for characterizing sensor performance.

FIG. 8 is a block diagram illustrating another test setup 800, in this case a hammer drop test setup to determine how well the sensor 802 works in detecting and reporting shock impact. Force is applied by a hammer hit to the top of the rig 806. This force is transmitted, via the reference sensor 628, to the sensor 802 which generates magnetic field pulses. The magnetic field pulses are received by a solenoid receiver 622 external to the sensor prototype 802. An embodiment of the invention can generate fast loading forces that can last 2-3 milliseconds and have a magnitude of 800 N. Other time periods and force magnitudes can be achieved in alternative embodiments.

A sheet metal stamping process is an example application to which some embodiments of the invention may be applied. The stamping process is characterized by very fast pressure ramping rates, sometimes approximately 300 MPa/s, due to the inherent contact stiffness of metal-to-metal contact. In addition, long lasting contacts of up to 10 s may occur during the stamping process, for example in pan drawing stamping.

In an embodiment, a threshold modulator circuit with high current handling capability and low leakage current meets certain design requirements for capturing process dynamics in high impact applications. In some embodiments, the threshold modulator is designed to have the following properties:

Turn ON Criteria: The threshold modulator may transition from an OFF to an ON mode when the output voltage of the piezostack, or any other input to the threshold modulator, exceeds the set threshold voltage in either the positive or negative direction. As an example, if the threshold voltage is set for 10V, the threshold modulator turns ON if the voltage increases above +10V or falls below −10V.

Turn OFF Criteria: Once in the ON mode, the threshold modulator turns OFF when the voltage from the piezostack is 0V. Such a switching action is represented as a functional substitute by a class of silicon bidirectional switches that changes mode from the ON mode to OFF mode, when the electrical current flowing through the switch falls under a certain threshold value, which is determined by the type of manufacturing process. This threshold current is referred to as the holding current, $I_h$. If $I_h$ is sufficiently low, the threshold modulator turns OFF when the voltage is close to 0 V. There may be certain disadvantages, however, if the holding current $I_h$ is low. As an example, if the force applied to the sensor is increasing at a fast rate, the current from the piezostack "swamps" the threshold modulator circuit such that the current through the threshold modulator circuit does not decrease below the holding current, which, in one embodiment, causes the threshold modulator circuit to remain in the ON mode.

Other Threshold Modulator Control Issues: An embodiment of the threshold modulator circuit has a near-infinite OFF impedance state, zero switching time, zero ON impedance state, and a negative resistance switching region.

An embodiment of the threshold modulator design includes a threshold modulator circuit with properties to turn it ON and OFF at the correct times while also using powerless components. In some manufacturing systems, no constant power supply is available to the circuit. The threshold modulator design resolves a trade-off between the signal transmission range and sensing resolution by controlling the threshold voltage at which it triggers.

Figure 9:
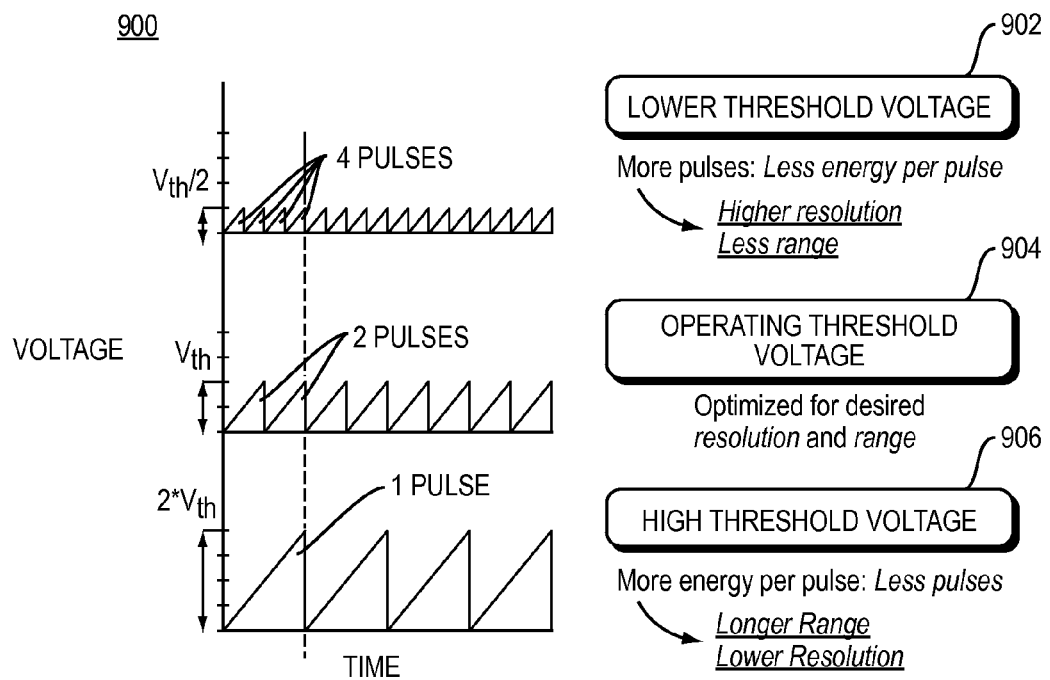
FIG. 9 is a plot illustrating a relationship between wireless signal range and resolution of a wireless signal transmitted between a transmitter and a receiver of an embodiment of the invention.

FIG. 9 is a set of graphs that illustrate this trade-off between signal transmission range and sensing resolution. For higher threshold voltages 906 of the threshold modulator circuit, the capacitor, which is a piezoelectric stack in some embodiments, charges to a higher voltage before triggering the modulator circuit into the ON mode. Therefore, when there is a higher threshold voltage 906, the capacitor stores a higher amount of energy when the threshold modulator circuit turns ON. This higher amount of stored energy in the capacitor causes a higher current to flow in the transmitting coil of the sensor, generating a stronger magnetic field pulse and consequently, a longer signal transmission range. The increase in transmission range is at the expense of a lower measurement resolution of the sensor because increasing the threshold voltage increases the charging time of the capacitor. As a result, with a higher threshold voltage, each pulse that the threshold modulator emits represents a larger change in the force signal acting on the piezostack.

A lower threshold voltage 902 corresponds to a smallest detectable force change that can be resolved by the sensor. Decreasing the threshold voltage lowers the transmission range in exchange for higher sensing resolution. Such adaptability in the threshold modulator circuit design is useful for a broad range of energy-efficient wireless applications. An embodiment of the invention allows for automated control of the threshold modulator circuit. This automated control can include modifying the threshold voltage, effectively changing the resolution and range of the transmission. Such an automated control may be done wirelessly by sending instructions to a receiver connected to the threshold modulator circuit.

Figure 10:
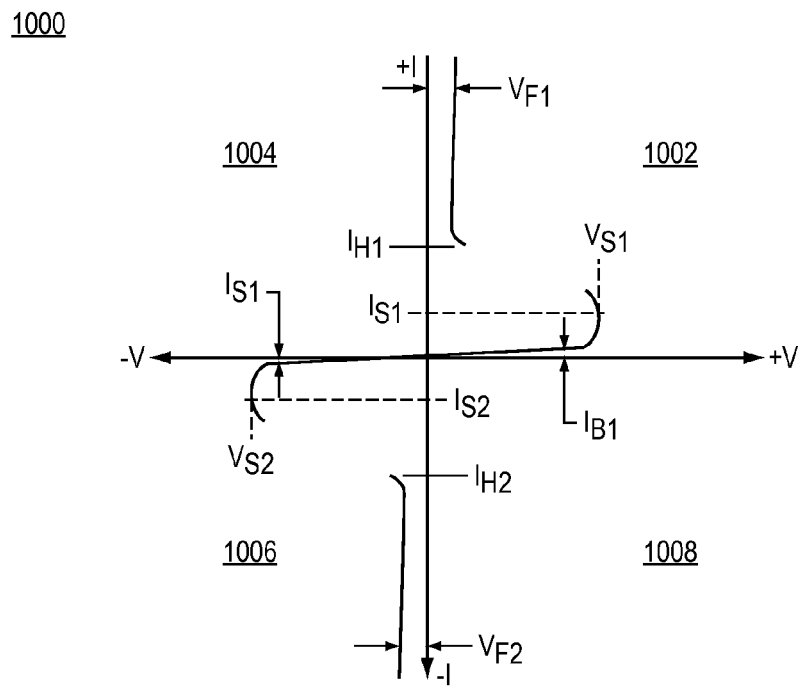
FIG. 10 is a graph illustrating a voltage-current characteristic of a silicon bidirectional switch (SBS) within a threshold modulator circuit.

FIG. 10 is a graph 1000 illustrating the voltage-current (VI) characteristic of the silicon bidirectional switch (SBS) 208 (FIG. 2). The SBS is symmetric in its positive and negative voltage regions.

In one embodiment, as the voltage applied to the SBS increases from 0 to $V_{S1}$, the device has a high impedance, illustrated by the linear portion of the curve in the first quadrant 1002 of the graph 1000, with high voltage and low current values. As a result, only a small amount of current $I_{B1}$ flows through the silicon bidirectional switch, which is referred to as the leakage or the blocking current. This leakage current or blocking current, in one embodiment, can be on the order of 0.08 to 1 µA DC. Having a low leakage current in the circuit design is beneficial in certain embodiments, as a low leakage current represents a slow waste of energy stored in the piezostack when signals are not being transmitted.

As the applied voltage approaches the threshold voltage $V_{S1}$, the impedance of the device starts decreasing, i.e., more current starts passing through, even though the applied voltage remains largely constant. After the threshold voltage $V_{S1}$, the silicon bidirectional switch device undergoes a negative resistance region, where the current increases drastically to $I_{H1}$, and beyond, even though the voltage is decreasing. The SBS behaves in a similar manner when a negative voltage is applied, as shown in third quadrant 1006.

The SBS alone can act as the threshold modulator; however, the applications of this design may be limited. In some embodiments, the switch OFF criteria for the SBS is current controlled. In such embodiments, the SBS switches OFF only if the throughput current is under a certain holding current $I_h$. This holding current is on the order of 0.7~1.5 mA DC, in certain embodiments employing a commercially available SBS. An SBS can get "stuck" in the ON condition and not generate pulses. The SBS does not have any voltage-current characteristics that are displayed in the second quadrant 1004 or the fourth quadrant 1008.

Figure 11:
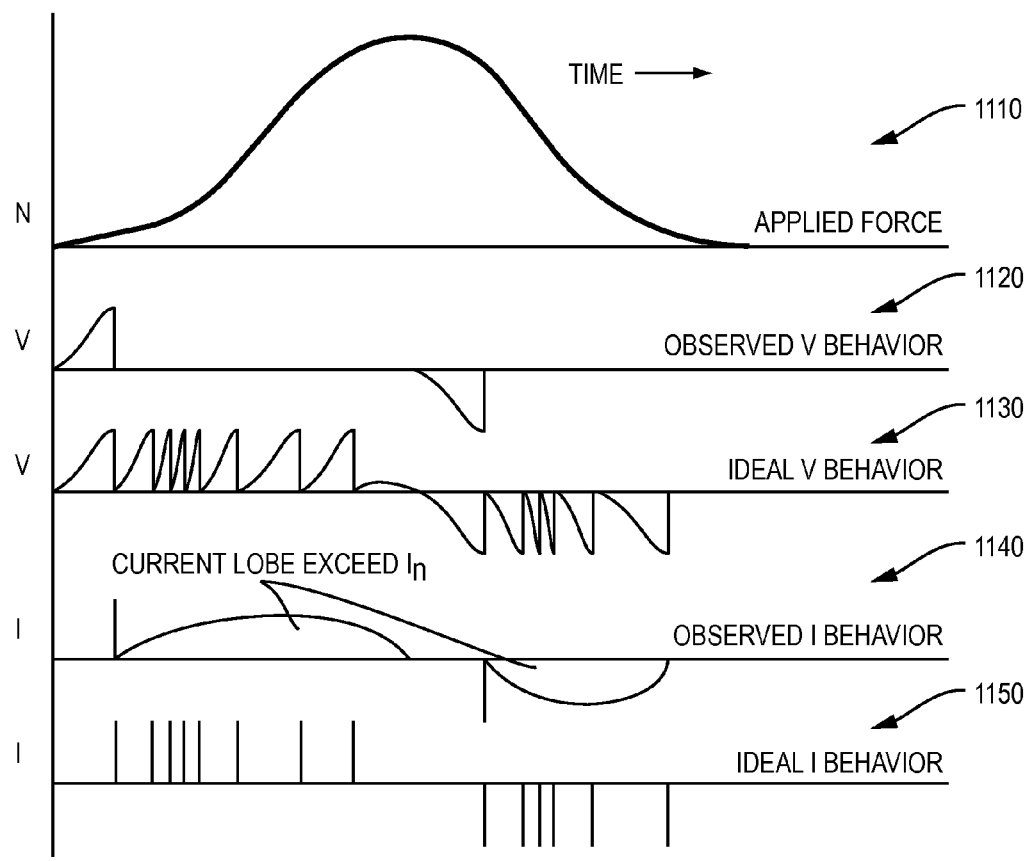
FIG. 11 are graphs illustrating example test results of a silicon bidirectional switch (SBS) within an embodiment of the present invention.

FIG. 11 is a set of chart diagrams illustrating behavior of the sensor (e.g., sensor 100, FIG. 1) in response to a force. A first plot 1110 shows an example of a force applied to the piezostack, while second plot 1120 shows an example of the corresponding voltage observed across the piezostack. The plot 1120 is not oscillating as ideally expected and illustrated in the third plot 1130, which represents the ideal voltage behavior. A current generated by the piezostack can exceeds $I_h$ 1140, which causes the SBS to get "stuck" in the ON mode, and, therefore, it does not generate pulses, as in the ideal case of the third plot 1130.

In some embodiments, the overcurrent condition can be avoided by using suitable electronic components. For example, the circuit of the sensor may include a thyristor into the circuit can handle the higher current. The silicon bidirectional switch then functions only to switch the thyristor ON and OFF, and the load current is handled by the thyristor. The resistor functions to limit the current through the silicon bidirectional switch; thus, the resistor's resistance value is chosen to keep the current through the silicon bidirectional switch under $I_h$ at all times. The sensor may combine the SBS, for switching current ON and OFF, with the thyristor, for handling high current, such that the desired performance is as illustrated in the ideal behavior plot 1150. The thyristor may also have an upper current handling limit that is specific to the thyristor device chosen. Should the current flow exceed the current handling limit of the thyristor, the overcurrent (e.g., excess current) problem described above may re-appear.

In some embodiments, the range of forces that can be measured by the sensor is a function of the electrical transducer or piezostack and the silicon bidirectional switch/thyristor circuit parameters.

In some embodiments, the upper limit of the sensor performance is determined by the upper current handling capability of the threshold modulator circuit, which depends on the specifications of the selected thyristor, and the maximum yield strength of the electrical transducer or piezostack (e.g., the amount of force that can be applied to the electrical transducer without creating irreversible structural damage).

The lower limit of the sensor is determined by leakage current in the SBS/thyristor combination in the OFF mode, and the electrical transducer or piezostack specifications. In one example, for small forces a particular choice of piezostack may not generate enough voltage to trigger the threshold modulator. A piezostack with thicker piezoelectric discs may be selected which generate a higher voltage for the same force applied to trigger the threshold modulator for these small forces.

The susceptibility of the transmitted signal to environmental noise and interference can be addressed on a per-application basis. The transmitter-receiver pair can be optimized for best signal reception depending on the application.

In one embodiment, a simplistic and practical approach to reconstructing the original force signal from a received pulse (of the type shown in FIG. 3) is to assume that each pulse corresponds to the actual force increasing or decreasing by a set amount. In another embodiment, a mathematically more rigorous method is to associate the arrival of each pulse with a finite and equal development of charge in the piezostack. The force can be accurately reconstructed by applying a charge-to-force transfer function to the input signal. Other embodiments may employ polynomial approximation or other mathematical reconstruction techniques.

Slip rings have been used broadly for coupling power and/or signal transmission from one point to another. A commonly known problem associated with the use of slip rings is that they generate undesirable electrical noise and can be unreliable due to wear and tear.

One embodiment of a non-contact slip ring according to an embodiment of the invention can be used to replace a conventional slip ring and provide an information coupling communications link that has less electrical noise and no mechanical parts that wear over time. In this embodiment, information can be transmitted across a rotating (or linearly moving) boundary.

Figure 12:
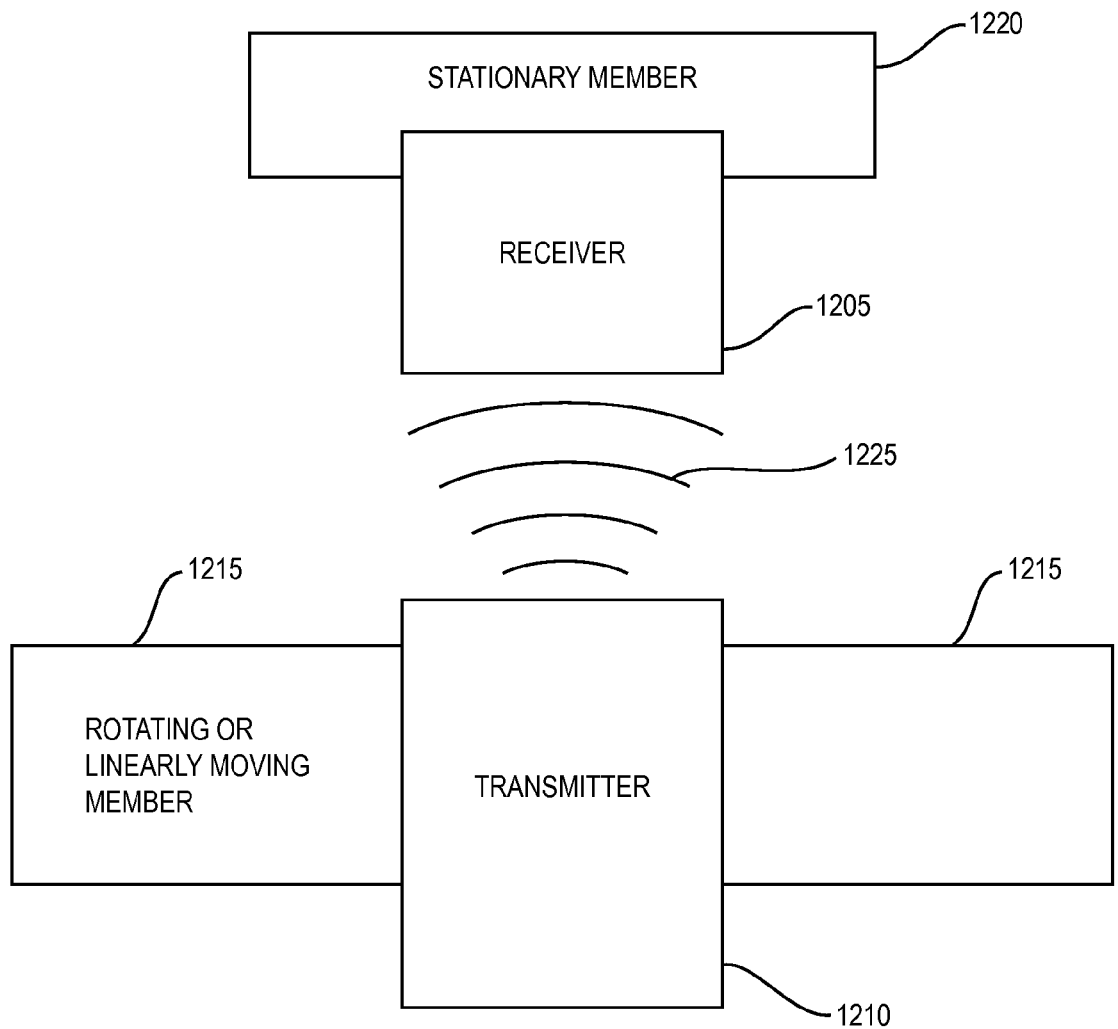
FIGS. 12 and 13 are block diagrams of non-contact slip rings according to an embodiment of the present invention.

FIG. 12 is a block diagram illustrating an embodiment of the invention applied as a non-contact slip ring 1200. The transmitter 1210 is coupled with a rotating member 1215. The receiver 1205 is coupled with a stationary member 1220. As the rotating member 1215 rotates, the transmitter 1210 can transmit wirelessly to the receiver 1205.

Figure 13:
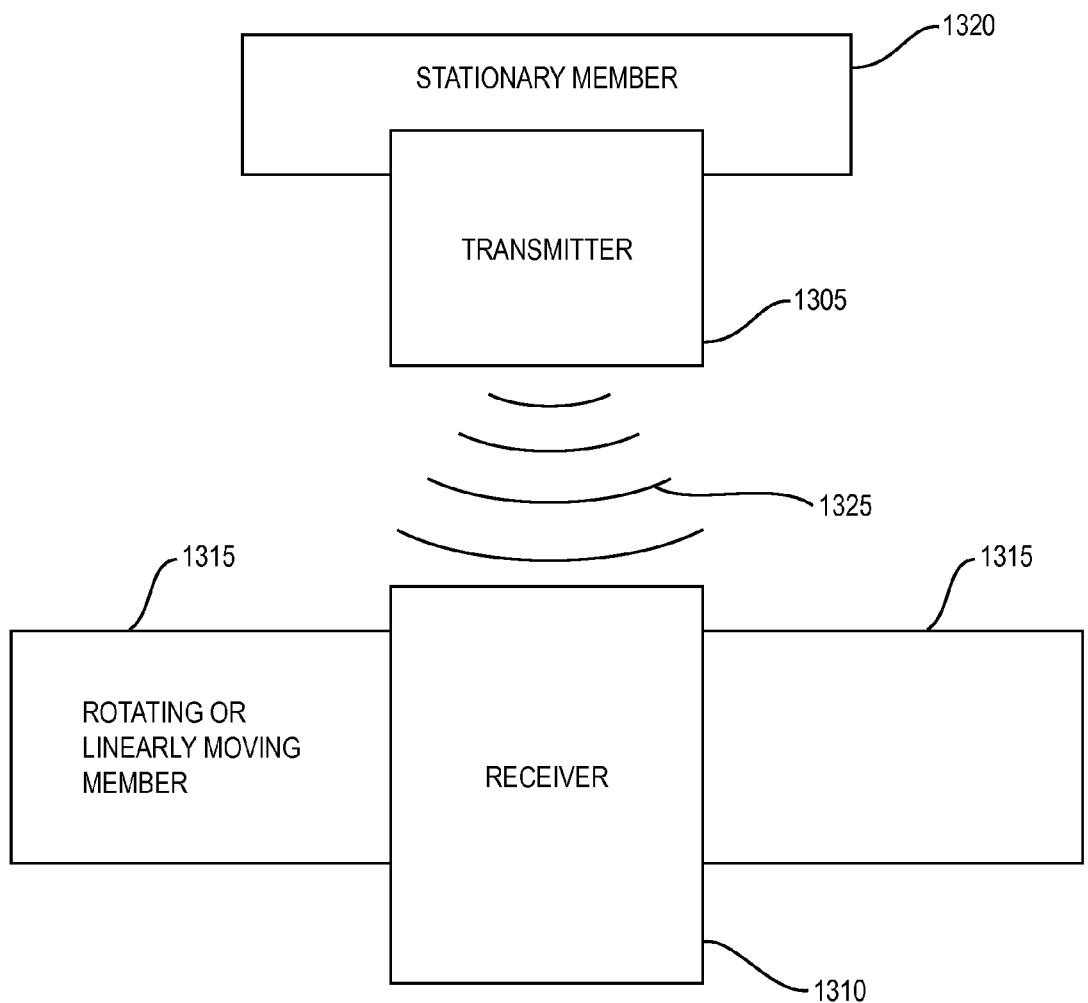

Similarly, FIG. 13 is a block diagram illustrating another embodiment of the receiver applied as a non-contact slip ring 1300. In this embodiment, the transmitter 1305 is coupled with the stationary member 1320. The receiver 1310 is coupled with the rotating member 1315. As the rotating member 1315 rotates, the transmitter can transmit wirelessly to the receiver 1310. Slip ring setups 1200 and 1300 are examples of ways a non-contact slip ring embodiment of the invention could establish one or two way communication with a rotating member.

Embodiments of the device can be employed to monitor high-energy manufacturing processes. The device enables remote inquiry of machines and processes through structurally integrating the device into places that are hard to access conventionally with wired devices due to restrictions in cable connections and high shock loads.

Embodiments of the device can be integrated into shock absorbers to provide force feedback for better vibration and shock isolation and control in transportation vehicles and machine systems.

Embodiments of the device can be used to monitor buildings, bridges, or tunnels for improved safety under high loading conditions, in one example, caused by natural or man-induced conditions.

Embodiments of the device can assist in education because the wireless sensor is an excellent example of a mechatronic system. The device combines mechanical and electrical designs with piezoelectric element modeling, wireless communications, wave propagation, and signal and control theories. The device can be developed into a module that serves as an interactive teaching aid for undergraduate and graduate teaching.

It should be understood that certain aspects of the invention, such as a receiver with reconstruction processes, can be implemented in the form of hardware, firmware, or software. If implemented in software, the software can be stored on any form of non-transient computer-readable media. The software may be written in any language capable of being loaded and executed by a processor and able to perform the operations disclosed herein or equivalents thereof. Likewise, the processor may be a general purpose or application-specific processor capable of performing the operations disclosed herein or equivalents thereof.

As discussed, the term "information" refers to measurements of a machine. However, the term "information" can also refer to non-machine measurements, such as alpha-numeric text, data, version number, product number, product data, or any other information that can be stored in an internal memory, and such information can refer to the sensor or machine to which the sensor is applied. The information can be provided by a manufacturer or customizable by a user. The information can be stored in a memory (e.g., a RAM or ROM) associated with the sensor. Contents of the memory can be output or otherwise directed to the threshold modulator circuit by the sensor at selected times or by request from the user. In an embodiment where the sensor transmits non-machine measurements, the sensor may employ a switch (e.g., a transistor such as a MOSFET) that switches the input of the threshold modulator circuit from machine measurements to non-machine measurements and vice-versa. The switch can be toggled by the requests from the user or at the selectable times. It should be understood that the threshold modulator circuit may convert information from binary encoded representations to electrical pulse representations as described above with respect to voltages produced by the piezoelectric transducer.

While this invention has been particularly shown and described with references to example embodiments thereof, it will be understood by those skilled in the art that various changes in form and details may be made therein without departing from the scope of the invention encompassed by the appended claims.

What is claimed is:

1. A method of transmitting information by a circuit via a wireless medium, the method comprising:
converting an electrical signal representing information into a series of electrical pulses; and
generating a series of magnetic field pulses corresponding to the series of electrical pulses to transmit a representation of the information via a wireless medium.

2. The method of claim 1, further comprising:
receiving the series of magnetic field pulses via the wireless medium; and
reconstructing the information based on the series of magnetic field pulses received.

3. The method of claim 1, wherein the electrical signal is a representation of a physical force or pressure.

4. The method of claim 1, wherein the electrical signal is an analog waveform.

5. The method of claim 1, wherein the series of magnetic field pulses is a digital waveform.

6. The method of claim 1, further comprising resolving the series of electrical pulses using n-levels, wherein n is based on a largest expected amplitude divided by a minimum amplitude detection level of the electrical signal.

7. The method of claim 1, further comprising operating in a self-powered manner.

8. The method of claim 1, wherein converting the electrical signal employs a threshold modulator circuit including a silicon bidirectional switch, thyristor, and resistor.

9. The method of claim 8, further comprising enabling the resistor to be selectively programmed.

10. The method of claim 8, further comprising enabling automated control of the threshold modulator circuit to change the resolution and range of the transmission, said automated control receiving instructions via a wireless medium.

11. The method of claim 1, further comprising employing a force-to-electrical transducer to produce the electrical signal.

12. The method of claim 11, wherein the force-to-electrical transducer is a piezoelectric transducer.

13. The method of claim 11, wherein converting the electrical signal includes employing a threshold modulator circuit and generating a series of magnetic field pulses includes employing an inductive transmitter, and further comprising supporting bidirectional current flow around a loop that includes the transducer, threshold modulator circuit, and inductive transmitter.

14. A circuit comprising:
an input port and an output port;
a resistor having a first lead and a second lead;
a silicon bidirectional switch electrically coupled in series with the input port and the first lead of the resistor; and
a thyristor having its voltage control input coupled in series with the second lead of the resistor and its current flow path coupled in series with the input port and the output port;
wherein the resistor, silicon bidirectional switch, and thyristor compose a threshold modulator circuit, and
wherein the circuit is configured to receive an electrical signal at the input port, and convert the electrical signal to a series of electrical pulses using the threshold modulator circuit.

15. The circuit of claim 14, further comprising a transmitter component coupled to the output port configured to generate a series of magnetic field pulses corresponding to the series of electrical pulses.

16. The circuit of claim 15, further comprising a receiver component configured to receive the series of magnetic field pulses via a wireless medium from the transmitter component.

17. The circuit of claim 15, wherein the circuit is configured to enable automated control over the range and resolution of the series of magnetic field pulses by receiving instructions from a wireless medium.

18. The circuit of claim 14, wherein the electrical signal is a representation of a physical force or pressure.

19. The circuit of claim 14, wherein the electrical signal is an analog waveform.

20. The circuit of claim 14, wherein the electrical signal is a digital waveform that represents information.

21. The circuit of claim 14, wherein the circuit is configured to resolve the series of electrical pulses using n-levels, wherein n is based on a largest expected amplitude divided by a minimum amplitude detection level of the electrical signal.

22. The circuit of claim 14, further comprising a force-to-electrical transducer coupled to the input port and providing an electrical signal to the threshold modulator circuit as a function of force or pressure.

23. The circuit of claim 22, wherein the force-to-electrical transducer is a piezoelectric transducer.

24. The circuit of claim 22, wherein the force-to-electrical transducer, threshold modulator circuit, and transmitter component form a loop around which current flow is bidirectional.

25. The circuit of claim 14, wherein the resistor is configured to be selectively programmed.

26. The circuit of claim 14, wherein the circuit is self-powered.

27. A communications system comprising:
a transducer configured to produce an electrical signal representative of an applied force or pressure;
a threshold modulator circuit coupled to the transducer and configured to convert the electrical signal to a series of electrical pulses; and
a transmitter coupled to the threshold modulator circuit and configured to convert the series of electrical pulses to a series of magnetic field pulses and transmit the series of magnetic field pulses via a wireless medium.

28. The communications system of claim 27, wherein the threshold modulator circuit includes a silicon bidirectional switch, a resistor, and a thyristor.

29. The communications system of claim 28, wherein the resistor is configured to be selectively programmed.

30. The communications system of claim 27, wherein the communication system is powered by energy generated by the transducer from the application of the force or pressure.

31. The communications system of claim 27, wherein the transducer is a piezoelectric transducer.

32. The communications system of claim 27, further comprising:
a receiver configured to receive the series of magnetic field pulses transmitted wirelessly via the wireless medium; and
a signal reconstruction circuit configured to determine the force or pressure from the series of magnetic field pulses.

33. The communications system of claim 32, wherein the electrical signal is a first electrical signal and the series of electrical pulses is a first series of electrical pulses and wherein the communications system further comprises a signal reconstruction circuit configured to convert the series of magnetic field pulses into a second series of electrical pulses and the second series of electrical pulses into a second electrical signal, the second electrical signal approximating the first electrical signal.

34. The communications system of claim 27, wherein the electrical signal is a digital waveform that represents information.

35. The communications system of claim 27, further configured to resolve the series of electrical pulses using n-levels, wherein n is based on a largest expected amplitude divided by a minimum amplitude detection level of the electrical signal.

36. The communications system of claim 27, wherein the threshold modulator circuit is configured to convert the electrical signal into a series of electrical pulses and the transmitter is configured to generate a series of magnetic field pulses as a function of the series of electrical pulses, wherein the communication system is configured to support a bidirectional current flow around a loop that includes the transducer, threshold modulator circuit, and inductive transmitter.

37. A communications system, comprising:
means for converting an electrical signal into a series of electrical pulses;
means for generating a series of magnetic field pulses corresponding to the series of electrical pulses; and
means for transmitting the series of magnetic field pulses via a wireless medium.

38. A non-contact slip ring, comprising:
an interior member comprising:
a transducer configured to produce an electrical signal representation of measured data;
a threshold modulator circuit coupled to the transducer configured to convert the electrical signal to a series of electrical pulses; and
a transmitter coupled to the threshold modulator circuit configured to convert the series of electrical pulses to a corresponding series of magnetic field pulses and transmit the series of magnetic field pulses via a wireless medium; and
an exterior member comprising:
a receiver configured to receive the series of magnetic field pulses from the transmitter via the wireless medium; and
a signal reconstruction circuit configured to determine the force or pressure as a function of the series of magnetic field pulse.

39. A circuit comprising:
an input port and an output port;
a resistor, configured to be selectively programmed, having a first lead and a second lead;
a silicon bidirectional switch electrically coupled in series with the input port and the first lead of the resistor; and
a thyristor having its voltage control input coupled in series with the second lead of the resistor and its current flow path coupled in series with the input port and the output port.

40. A circuit comprising:
an input port and an output port;
a resistor having a first lead and a second lead;
a silicon bidirectional switch electrically coupled in series with the input port and the first lead of the resistor; and
a thyristor having its voltage control input coupled in series with the second lead of the resistor and its current flow path coupled in series with the input port and the output port,
wherein the circuit is self-powered.

* * * * *